United States Patent [19]

Kondo et al.

[11] 4,303,981
[45] Dec. 1, 1981

[54] DISTANCE MEASURING ARRANGEMENT

[75] Inventors: Takashi Kondo, Izumi; Nobuo Hashimoto, Ashiya, both of Japan

[73] Assignee: Minolta Camera Kabushiki Kaisha, Azuchi, Japan

[21] Appl. No.: 76,954

[22] Filed: Sep. 19, 1979

[30] Foreign Application Priority Data

Sep. 19, 1978 [JP] Japan ............................. 53-115255

[51] Int. Cl.³ ............................................. G03B 7/08
[52] U.S. Cl. .................................. 364/525; 364/561; 364/571; 354/31; 354/25; 356/4
[58] Field of Search ................. 364/525, 561, 571; 356/1, 4; 354/25, 31, 60 R; 352/140; 250/201

[56] References Cited
U.S. PATENT DOCUMENTS 4,100,407 7/1978 Takahashi ........................ 354/60 R
4,162,123 7/1979 Isono .................................. 354/31
4,173,402 11/1979 Horike et al. ......................... 354/25
4,176,955 12/1979 Yamada et al. ....................... 354/31
4,200,934 4/1980 Hofmann et al. ................... 364/525

Primary Examiner—Edward J. Wise
Assistant Examiner—Gary Chin
Attorney, Agent, or Firm—Wenderoth, Lind & Ponack

[57] ABSTRACT

A distance measuring arrangement for use, for example, in a camera and the like equipped with an automatic focus control system which includes an illuminance intensity detecting portion for detecting the illuminance intensity of a target object and a distance signal correcting portion for correcting the distance signal from a distance measuring portion according to the output of the illuminance intensity detecting portion so as to obtain the distance signal not affected by the illuminance intensity of the target object.

6 Claims, 18 Drawing Figures

Fig. 1 PRIOR ART
Fig. 3 PRIOR ART
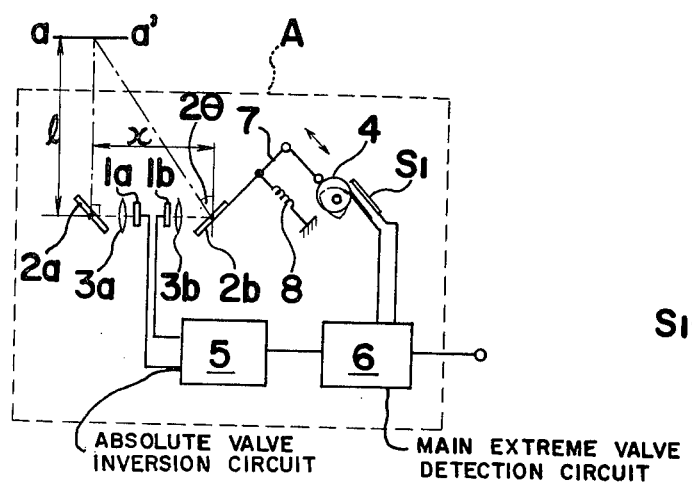
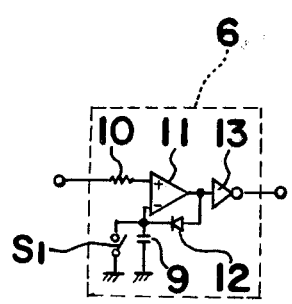
Fig. 2 (a)
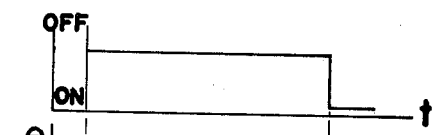
Fig. 2 (b)
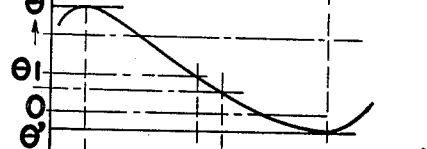
Fig. 2 (c)
Fig. 2 (d)
Fig. 2 (e)
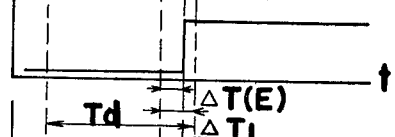
Fig. 2 (f)
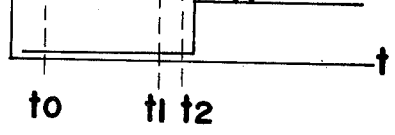

Fig. 6
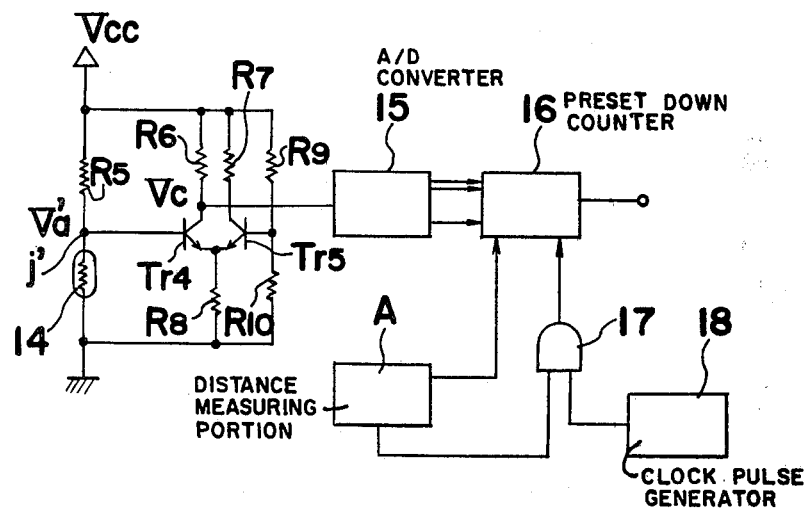
Fig. 7 (a)
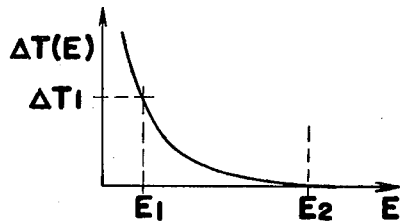
Fig. 7 (b)
Fig. 7 (c)
Fig. 7 (d)
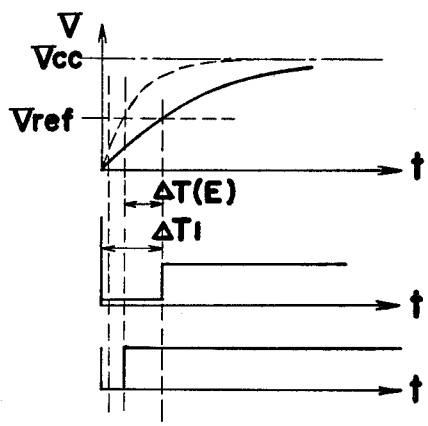

DISTANCE MEASURING ARRANGEMENT

BACKGROUND OF THE INVENTION

The present invention relates to a range finding arrangement or distance measuring arrangement and more particularly, to a distance measuring arrangement capable of obtaining distance signal based on outputs from photoresponsive elements for use, for example, in a camera provided with an automatic focus control system.

Commonly, there is a tendency for responsive characteristics of photoresponsive elements to be deteriorated with respect to a low intensity of illuminance. Accordingly, in the conventional distance measuring arrangements employing photoresponsive elements, there are such drawbacks that, against target objects or areas with a low intensity of illuminance, errors are involved in distance signals due to delays in the response of the photoresponsive elements and related circuits, making it impossible to carry out accurate distance measurements, and thus, the target objects or areas to be measured for determining their distance are undesirably limited.

More specifically, one example of the conventional distance measuring arrangements in which distance signals are obtained on the basis of outputs from photoresponsive elements will be described hereinbelow with reference to FIG. 1.

The known distance measuring arrangement A of FIG. 1 which is arranged to obtain signals indicative of distances based on the trigonometric distance measurement by taking correlation of spatial images formed on a pair of photoresponsive elements 1a and 1b, for example, of photodiodes, etc., includes a stationary mirror 2a, a movable mirror 2b for scanning, the pair of photoresponsive elements 1a and 1b disposed in a spaced relation between the mirrors 2a and 2b through corresponding image forming lenses 3a and 3b for forming images of a target object $\overline{aa'}$ on said photoresponsive elements 1a and 1b, an eccentric cam 4 to be driven for rotation by driving means (not shown), a synchronous switch S1 selectively opened or closed through the rotation of the cam 4, an absolute value inversion circuit 5 which is coupled to the photoresponsive elements 1a and 1b, and a main extreme value detection circuit 6 which is coupled to the absolute value inversion circuit 5 and also to the switch S1. The eccentric cam 4 is arranged to be rotated at a predetermined velocity $\omega t$ by the driving means (not shown), while a support member 7 supporting, at its one end, the movable mirror 2b is urged by a spring 8 to contact, at its other end, the peripheral edge of the cam 4 under pressure. By the above arrangement, the movable mirror 2b is caused to pivot through the support member 7, at a predetermined cycle as shown in FIG. 2(b), following the rotation of the eccentric cam 4, and the angle of deviation of the mirror 2b is represented by $\theta = \alpha(1 - \cos\omega t) - \theta'$, where $\theta'$ denotes the angle of deviation at the initial position of the movable mirror 2b and $\alpha$ represents a constant.

On the other hand, the absolute value inversion circuit 5 including, for example, a differential amplifier, an inverter, etc. (not shown) is so arranged as to invert the absolute value of the difference between outputs of the photoresponsive elements 1a and 1b, and develops an output voltage V as shown in FIG. 2(c). Meanwhile, the main extreme value detection circuit 6 includes a resistor 10 which is connected to the non-inverting input terminal of an amplifier 11, and also includes the switch S1 and a capacitor 9 which are connected to the inverting input terminal of the amplifier 11, and which is further coupled to the output side of the amplifier 11 through a diode 12 and also to an inverter 13, as shown in FIG. 3.

In the above arrangement, when the output voltage V of the absolute value inversion circuit 5 reaches the maximum value, the detection circuit 6 detects such a maximum value for converting the output thereof from a Low level to a High level as shown in FIGS. 2(d) and 2(e). More specifically, the main extreme value detection circuit 6 of FIG. 3 functions as a voltage follower after the switch S1 is opened as in FIG. 2(a) at a time period $t_0$, and following the output voltage of the inversion circuit 5, the capacitor 9 is charged, and when the output voltage of the inversion circuit 5 passes its maximum value, i.e. when it becomes lower than the voltage across the capacitor 9, the output of the amplifier 11 is inverted to alter the output of the inverter 13 from Low level to High level.

In the known distance measuring arrangement A as described above, the distance l up to the target object $\overline{aa'}$ may be represented by the relation $$l = X/\tan 2\theta \tag{1}$$

in which X denotes a base line length and can be obtained as a value of $\theta$, i.e. a function of time. In other words, on the assumption, for example, that the target object $\overline{aa'}$ is present in a fixed position at a distance l1, when the angle of deviation of the movable mirror 2b has reached a value $\theta 1$ given by the above equation (1), the images of the target object $\overline{aa'}$ formed on the pair of photoresponsive elements 1a and 1b are aligned with each other to produce the same output from the photoresponsive elements 1a and 1b, and thus, the output voltage V of the absolute value inversion circuit 5 reaches its maximum value. More specifically, as shown in solid lines in FIG. 2 (c), in a time period $t_1$ corresponding to the angle of deviation $\theta 1$, the output voltage V of the absolute value inversion circuit 5 reaches the maximum value. It should be noted here, however, that the above function relates only to the case where the intensity of illuminance of the target object $\overline{aa'}$ is high, and that, when the intensity illuminance of the target object aa' becomes low, a delay takes place in the output voltage V of the absolute value inversion circuit 5 as shown by dotted lines in FIG. 2c) due to the delay in response of the output from the photoresponsive elements 1a and 1b, with the result that, upon comparison between the case where the intensity of illuminance of the target object aa' is high and the case where it is low, a delay represented by $\Delta T(E)$ takes place in the distance signal which is the output of the main extreme value detection circuit 6 as shown in FIG. 2(e).

SUMMARY OF THE INVENTION

Accordingly, an essential object of the present invention is to provide a distance measuring arrangement for use, for example, in a camera which employs photoresponsive elements and is capable of accurately measuring distances with respect to target objects or areas having a wide range of illuminance intensities.

Another important object of the present invention is to provide a distance measuring arrangement of the above described type in which detection means for detecting illuminance of the target object or areas, and correction means for correcting distance signals from a distance measuring circuit according to outputs of the illuminance detecting means are provided for obtaining distance signals not affected by the illuminance intensitites of the target objects or areas.

A further object of the present invention is to provide a distance measuring arrangement of the above described type in which errors in the measurements of distances due to the delay in the distance signals are eliminated for enabling the correct measurements of distances.

A still further object of the present invention is to provide a distance measuring arrangement of the above described type which is simple in construction and accurate in functioning, and can be readily incorporated into cameras and the like of the kind at low cost.

In accomplishing these and other objects, according to one preferred embodiment of the present invention, there is provided a distance measuring arrangement having distance measuring means adapted to obtain distance signal based on outputs of photoresponsive elements which comprises means for detecting illuminance intensity of a target object or area, and means for correcting the distance signal from the distance measuring means according to an output of the illuminance intensity detecting means for obtaining the corrected distance signal which corresponds only to the distance of the target object or area and which is approximately constant with respect to the illuminance intensity of the target object or area. The distance measuring means is arranged to provide the distance signal as a function of time, and the distance signal correcting means further includes a delay circuitry for delaying the distance signal from the distance measuring means and a delay time control circuitry for controlling the delay time by the delay circuitry according to the output of the illuminance intensity detecting means. The corrected distance signal is arranged to be generated later than said distance signal by the time period corresponding to the illuminance intensity of the target object or area.

By the above arrangement according to the present invention, it has been made possible to accurately measure the distances with respect to the target object or area having a wide range of illuminance intensities without being affected by such illuminance intensities of the target object or area, with substantial elimination of disadvantages inherent in the conventional distance measuring arrangements of the kind.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1 is a schematic diagram explanatory of the construction of a conventional distance measuring arrangement (already referred to);

FIG. 2(a) is a graph explanatory of the state of a synchronous switch employed in the arrangement of FIG. 1;

FIG. 2(b) is a graph illustrating the angles of deviation of the movable mirror for scanning employed in the arrangement of FIG. 1;

FIG. 2(c) is a graph explanatory of the state of the output voltage from the absolute value inversion circuit employed in the arrangement of FIG. 1;

FIGS. 2(d) and 2(e) are diagrams explanatory of the state of a distance signal when illuminance intensities of a target object are high and low respectively;

FIG. 2(f) is a diagram illustrating the state of a corrected distance signal according to one embodiment of the present invention;

FIG. 3 is an electrical circuit diagram showing the construction of a main extreme value detection circuit employed in the conventional arrangement of FIG. 1 (already referred to);

FIGS. 5 and 6 are diagrams showing examples of specific circuit constructions of the arrangement of FIG. 4;

FIG. 7(a) is a graph showing the relationship between the illuminance intensity E and the response delay time $\Delta T(E)$;

FIG. 7(b) is a diagram illustrating the relationship between the elapse of charging time for a capacitor C1 and the reference potential in the circuit of FIG. 5;

FIGS. 7(c) and 7(d) are diagrams showing the state of the corrected distance signals in the cases where the illuminance intensities E of a target object are higher and lower than a predetermined value E2 respectively;

Before the description of the present invention proceeds, it is to be noted that like parts are designated by like reference numerals throughout several views of the accompanying drawings.

DETAILED DESCRIPTION OF THE INVENTION

Figure 4:
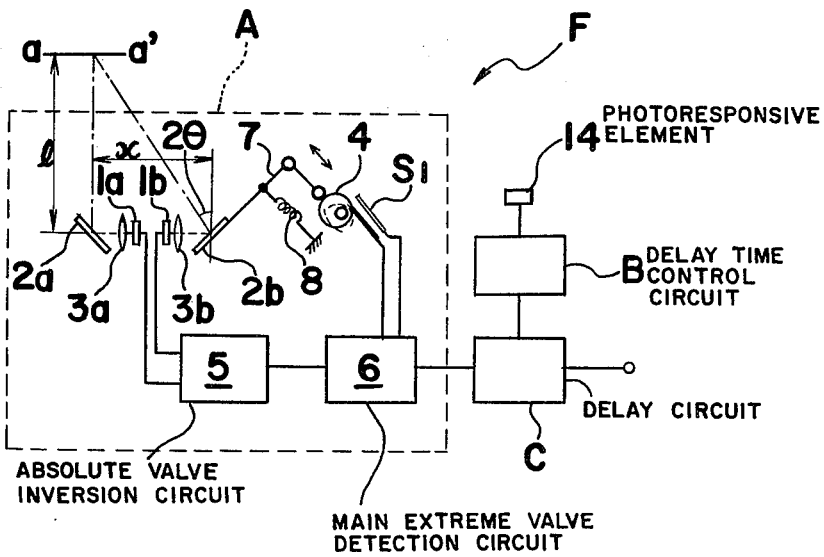
FIG. 4 is a block diagram showing the construction of a distance measuring arrangement according to one preferred embodiment of the present invention.

Referring now to the drawings, the present invention will be described in detail hereinbelow.

In the first place, in the graph of FIG. 7(a) which is explanatory of the basic concept for the embodiment of the present invention, the intensity E of illuminance of the target object is shown on the abscissa, while the delay time $\Delta T(E)$ in the response described earlier is plotted on the ordinate. As is seen from the graph of FIG. 7(a), when the illuminance intensity E of the target object is reduced below a predetermined value E2, the delay $\Delta T(E)$ in the distance signal appears and continues to monotonously increase up to a light measuring limit for the photoresponsive elements 1a and 1b, i.e. up to an illuminance intensity whereat the light measurement can not be taken owing to an excessively weak signal current with respect to the dark current. In connection with the above, when photographic devices such as cameras, etc. are taken into consideration, it is desired to eliminate the errors in the distance measuring arising from the delay $\Delta T(E)$ in the response up to the lowest illuminance intensity E1 which is the limit of the light measuring range to be determined by exposure conditions of the photographic devices. Accordingly, the embodiment of the present invention is based on the concept as follows.

That is to say, when $E > E2$, a delay is applied to the output of the main extreme value detection circuit 6 by the delay time $\Delta T1$ occuring at the time of the illuminance intensity $E1$. In other words, when $E > E2$, the function $T(l,E)$ of the distance $l$ and illuminance intensity $E$ is subjected to biasing by the delay time $\Delta T1$, and the time period $Td(l)$ from the opening of the switch S1 to obtaining of the distance signal is represented by the equation $Td(l) = T(l,E) + \Delta T1$ as shown in FIG. 2(f).

Meanwhile, when $E1 < E < E2$, the time period in which the distance signal is obtainable is accelerated by the response delay time $\Delta T(E)$ of the output of the photoresponsive elements 1a and 1b as compared with the case when $E > E2$. More specifically, when $E1 < E < E2$, the time period $Td(l)$ is set so as to be represented by the equation:

$$Td(l) = T(l, E) + \Delta T1 - \Delta T(E).$$

By the above arrangement, when $E > E1$, the time period $Td(l)$ is rendered to be constant with respect to a given distance $l$ irrespective of the intensities of illuminance of the target object.

Referring particularly to FIG. 4, there is shown a distance measuring arrangement F according to one preferred embodiment of the present invention in which the principle described in the foregoing is incorporated in an approximate manner. The distance measuring arrangement F of FIG. 4 includes the distance measuring portion A having the construction generally similar to the conventional arrangement of FIG. 1 described earlier, and a photoresponsive element 14, for example, a CdS cell provided for detecting the average illuminance intensity of the target object and coupled to the portion A through a delay time control circuit B and a delay circuit C, which are connected to the main extreme value detection circuit 6 of said portion A as shown. The delay circuit C is arranged to delay the output of the main extreme value detection circuit 6 so as to produce a corrected distance signal in a manner as described hereinbelow.

Figure 5:
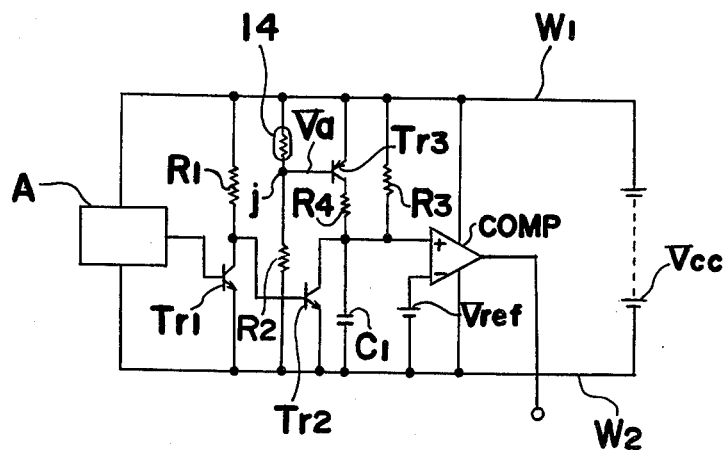

In FIG. 5, showing one example of the constructions of the delay time control circuit B and delay circuit C, the photoresponsive element 14, composed of a CdS cell, and a resistor R2 are connected in series between a line W1 from a positive side and a line W2 from a negative side of a power source Vcc which is also connected to the distance measuring portion A elements 14 and R2 constitute a voltage division circuit so as to produce a voltage Va corresponding to the illuminance intensity of the target object at a junction j therebetween. To the junction j, there is connected the base of a transistor Tr3 whose emitter is connected to the line W1 and whose collector is connected to a capacitor C1 through a resistor R4 and also connected the non-inverting input terminal of a comparator COMP in parallel with a resistor R3 which is also connected between the line W1 and the noninverting input terminal of the comparator COMP.

Across the capacitor C1, a transistor Tr2 is connected at its collector and emitter; the base of the transistor Tr2 is connected to a junction between a resistor R1 and a collector of a transistor Tr1 which are connected in series between the lines W1 and W2; the emitter of the transistor Tr1 is connected to the line W2 and the base thereof coupled to the output terminal of the distance measuring portion A. The inverting input terminal of the comparator COMP, whose non-inverting input terminal is connected to the positive terminal of the capacitor C1, is connected to a reference power supply Vref.

In the circuit construction of FIG. 5, as described above, when the output of the distance measuring portion A is converted from Low level to High level as mentioned previously, the transistor Tr1 is rendered conductive, while the transistor Tr2 is turned OFF, with the charging of the capacitor C1 being started. Subsequently, when the charging potential of the capacitor C1 exceeds the potential of the reference power supply Vref, the comparator COMP output is inverted to produce a high level output which becomes the corrected distance signal. In the above case, however, if the illuminance intensity E of the target object is higher than the predetermined illuminance intensity E2, the voltage Va at the junction j rises to exceed a predetermined value, and thus the transistor Tr3 is turned OFF so that the capacitor C1 is charged only by the current flowing through the resistor R3, with the potential of the capacitor C1 rising comparatively slowly as shown in solid lines in FIG. 7(b). In this state, if the time constant for the resistor R3 and capacitor C1 has been properly determined, the charging potential of the capacitor C1 exceeds the potential of the reference power supply Vref after the time period $\Delta T1$ has elasped from the starting of the charging of the capacitor C1, and thus the corrected distance signal can be obtained. On the contrary, when the illuminance intensity E of the target object is lower than the predetermined illuminance intensity E2, the transistor Tr3 is rendered conductive and the collector current corresponding to the voltage value Va at the junction j flows. In other words, the voltage Va at the junction j is lowered with a decrease of the illuminance intensity E of the target object, with a consequent increase of the collector current of the transistor Tr3. Accordingly, the capacitor C1 is rapidly charged by both the collector current and the current flowing through the resistor R3 as shown by dotted lines in FIG. 7(b), and the charging potential thereof exceeds the potential of the reference power supply Vref after the time period represented by ($\Delta T1 - \Delta T(E)$) has elapsed from the starting of the charging, and at this time point, the corrected distance signal is available. FIGS. 7(c) and 7(d) respectively show the trend of the corrected distance signal when the illuminance intensities E of the target object are higher and lower in the level than the predetermined illuminance intensity E2, i.e. the transition of the output from the comparator COMP after the transistor Tr2 has been cut off.

Figure 8:
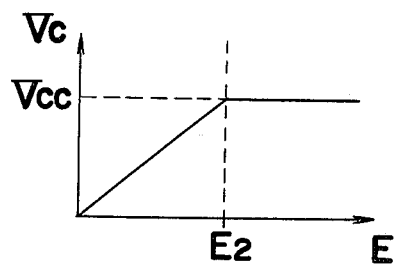
FIG. 8 is a graph showing the relationship between a potential Vc at a junction of a transistor Tr4 and a resistor R5 and the illuminance intensity E in the circuit construction of FIG. 6.

Referring to FIG. 6, there is shown another example of the construction of the delay time control circuit B and delay circuit C utilizing digital circuits, in which the voltage V'a corresponding to the illuminance intensity E of the target object is obtained at the junction j' of a resistor R5 and the CdS cell 14. The base of the transistor Tr4, constituting a differential amplifier together with a transistor Tr5, is connected to the junction j' between the resistor R5 and CdS cell 14; the base of the transistor Tr5 is connected to a junction between resistors R9 and R10 which are connected in parallel with the series-connection of the resistor R5 and CdS cell 14. Meanwhile, the collector of the transistor Tr4 is connected to the power source Vcc through a resistor R6; and the collector of the transistor Tr5 is also connected to the power source Vcc through a resistor R7;

while the emitters of the transistors Tr4 and Tr5 are connected to ground through a resistor R8. By the above arrangement, at a junction between the collector of the transistor Tr4 and resistor R6, a voltage Vc corresponding to the illuminance intensity of the target object is obtained as shown in FIG. 8. More specifically, when the illuminance intensity E of the target object is higher than the predetermined illuminance intensity $E_2$, the voltage V'a is reduced below a predetermined value, and the transistor Tr4 is cut off. Consequently, the voltage Vc becomes equal to the potential of the power source Vcc. On the contrary, when the illuminance intensity E falls below the predetermined illuminance intensity $E_2$, the collector current corresponding to the difference between the voltage V'a and the potential at the junction of the resistors R9 and R10 is caused to flow, and the voltage Vc decreases in proportion to the illuminance intensity E of the target object.

On the other hand, to the junction between the resistor R6 and collector of the transistor Tr4, there is coupled an A/D converter 15, which is in turn coupled to a preset down counter 16, the distance measuring portion A is coupled to the counter 16 through an AND gate 17 which is also connected to a clock pulse generator 18. The A/D converter 15 is arranged to convert the voltage Vc into a digital number to be fed to the preset down counter 16, which is preset according to the digital output from the A/D counter 15 by a synchronized signal from the distance measuring portion A, i.e. the signal synchronized with the opening of the switch S1. When the output from the main extreme value detection circuit 6 of the distance measuring portion A becomes a High Level, the AND gate 17 is opened and the preset down counter 16 begins to count the clock pulses of predetermined period which are emitted by the clock pulse generator 18. When the number of clock pulses reaches a preset value corresponding to the voltage Vc, the borrow output of the preset down counter 16 is changed from a Low Level to a High Level so as to become the corrected distance signal. As is seen from the foregoing description, in the above circuit, since the voltage Vc corresponds to the illuminance intensity as shown in FIG. 8, a delay time represented by $\Delta T1-\Delta T(E)$ is obtained when $E<E2$ by setting the time period from the opening of the switch S1 to the obtaining of the corrected distance signal equal to $\Delta T1$ when the voltage Vc equals as Vcc, and thus, the time period Td(l) from the opening of the switch S1 to the obtaining of the distance signal becomes constant with respect to a given distance l irrespective of the illuminance intensity of the target object.

Figure 9:
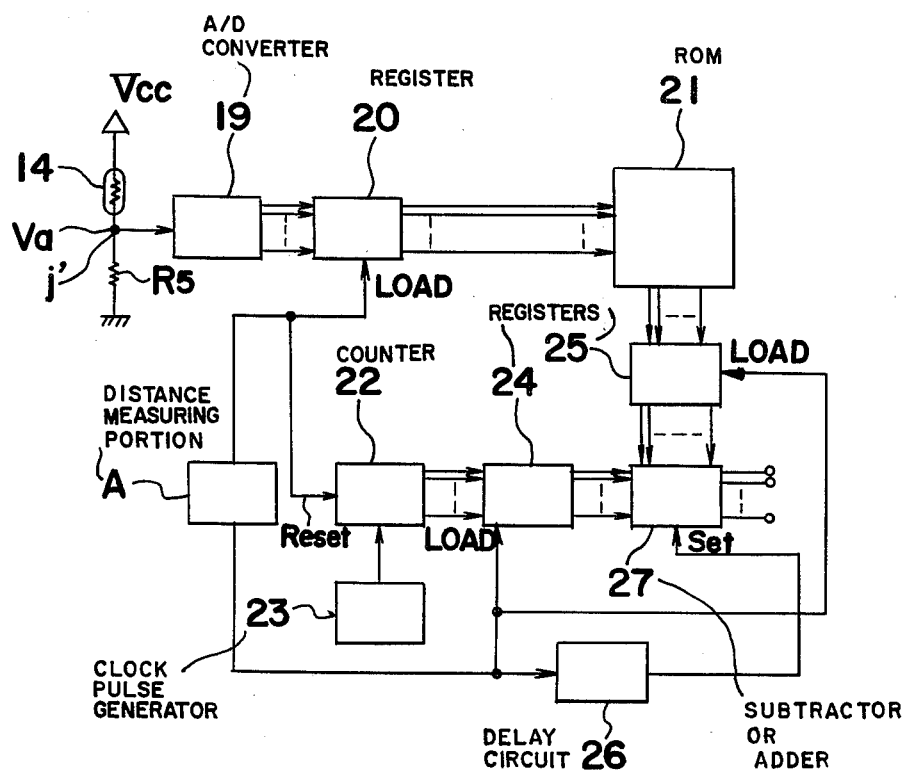
FIG. 9 is a diagram showing another example of a specific circuit construction of the arrangement of FIG. 4.

Referring to FIG. 9, there is shown a further embodiment in which a corrected distance signal obtained through correction of the distance signal from the distance measuring portion A by the correcting amount stored in an ROM is developed as a digital output. In the arrangement of FIG. 9, the CdS cell 14 and resistor R5 are connected to the power source Vcc in a manner similar to the arrangement of FIG. 5, and the voltage Va is obtained at the junction j' between the CdS cell 14 and resistor R5. The junction j' is coupled through an A/D converter 19 and a register 20 to ROM 21 which is in turn connected to another register 25 and a subtracter or adder 27; the register 20 is coupled to a counter 22 connected to a clock pulse generator 23 and also to the adder 27 through a register 24. The distance measuring portion A coupled to a junction between the register 20 and counter 22 and is further coupled to the registers 24 and 25, and also to the subtractor or adder 27 through a delay circuit 26.

Figure 10:
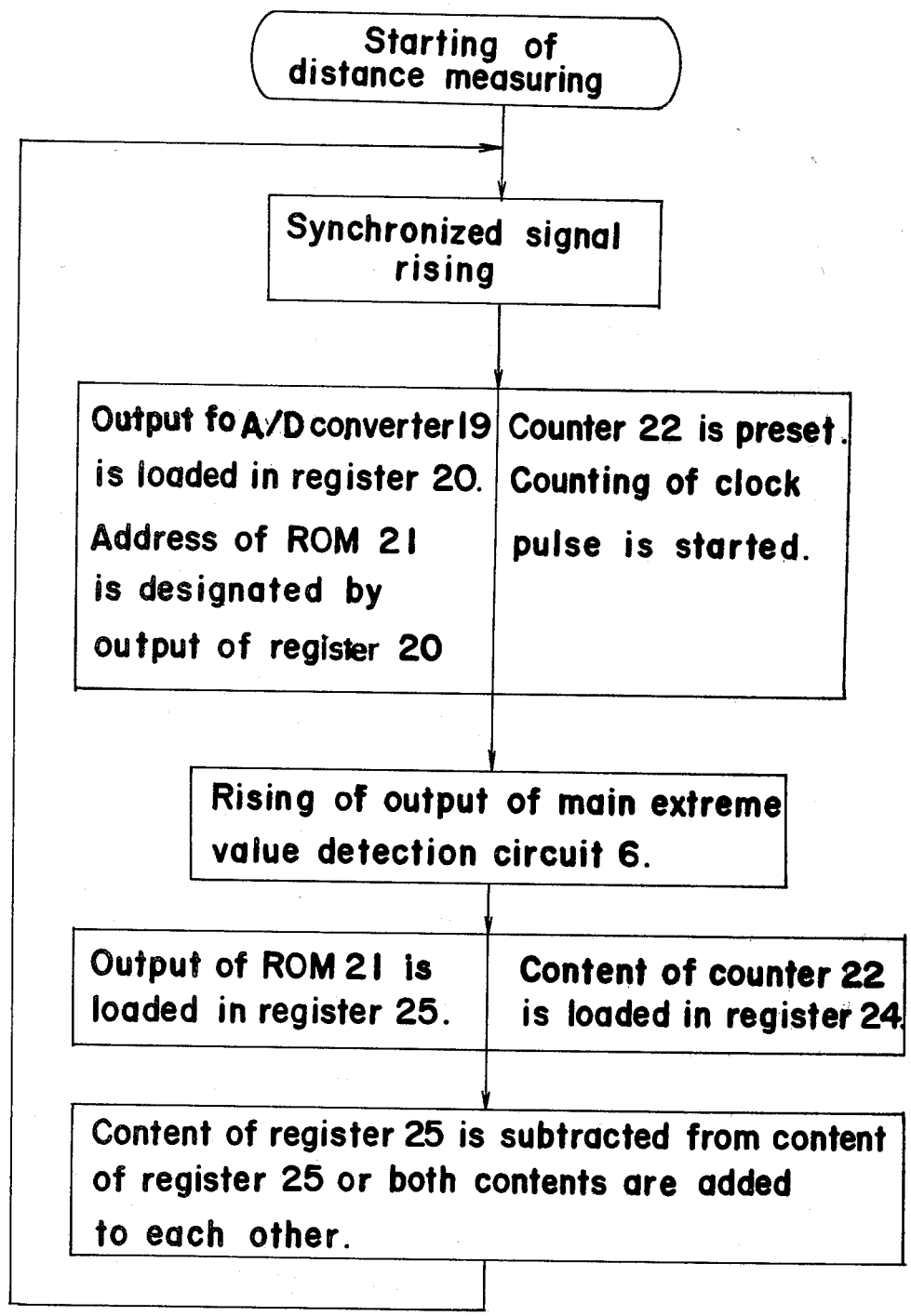
FIG. 10 is a flow chart explanatory of the functions of the distance measuring arrangement of FIG. 9.

In the above arrangement, the voltage Va produced at the junction j' is converted into digital numbers by the A/D converter 19 so as to be loaded in the register 20 by the synchronizing signal from the distance measuring portion A, i.e. by the positive edge (rising edge) of the signal synchronized with the opening of the switch S1 for designating the address of the ROM 21 in which the value $\Delta T1-\Delta T(E)$ is stored. Meanwhile, the counter 22 is also reset by the positive edge of the above synchronized signal from the distance measuring portion A for starting the counting of the clock pulses of a predetermined period cycle from the clock pulse generator 23, and the count stored in the counter 22 is loaded in the register 24 by the positive edge of the output from the main extreme value detection circuit 6 of the distance measuring portion A. On the other hand, by the positive edge of the output from the above main extreme value detection circuit 6, the value of $\Delta T1-\Delta T(E)$ stored in the designated address is loaded in the register 25 from the ROM 21. Furthermore, the delay circuit 26 also starts functioning by the positive edge of the output from the main extreme value detection circuit 6 and sets after a slight delay, the subtractor or adder 27, which then subtracts the content of the register 25 from the content of the register 24 or adds the former to the latter for producing the results of the operation as a digital output. The above digital output is equivalent to the value represented by $\Delta T(l,E)+\Delta T1-\Delta T(E)$, which becomes the corrected distance signal. The functions of the distance measuring arrangement described so far are shown in the form of a flow chart in FIG. 10.

Subsequently, applications of the foregoing embodiments of the distance measuring arrangements according to the present invention to an automatic focus control system will be described hereinbelow.

In the first place, for the applications of the distance measuring arrangements of FIGS. 5 and 6, it is so arranged, for example, that by providing a capacitor (not shown) started to be charged in synchronization with the opening of the switch S1, the charging of said capacitor is stopped by the corrected distance signal mentioned earlier. Meanwhile, a potentiometer (not shown) is provided on an objective lens barrel of an optical device (not shown) in such a manner that its sliding terminal voltage is varied according to advancing positions of the objective lens, and after stopping the charging of the above mentioned capacitor, the objective lens is advanced until the terminal voltage of the potentiometer reaches the charged potential of said capacitor. In the above case, by preliminarily causing the setting of the potentiometer or the charged potential of said capacitor to deviate by a predetermined amount with respect to the amount of advancing of the objective lens, it is possible to make the corrected distance signal accurately correspond to the advancing position of the objective lens.

On the other hand, the distance measuring arrangements of the embodiments of FIGS. 5 and 6 may be applied to an automatic focus control system in such a manner that, the objective lens is advanced along with the pivotal movement of the movable mirror 2a, while an electromagnetic means (not shown) is actuated by the corrected distance signal as described above and the advancing of the objective lens is stopped by the electromagnetic means at a time point where the corrected distance signal is obtained. In this case, by arranging the starting of the advancing of the objective lens to be later than the opening of the switch S1 by the time period ΔT1, the corrected distance signal can be made to correctly correspond to the advancing position of the objective lens.

Meanwhile, for applying the distance measuring arrangement of the embodiment of FIG. 9 to an automatic focus control system, it may be so arranged, for example, that, with a binary code which outputs digital signals corresponding to the advanced positions of the objective lens being provided on the objective lens barrel, the objective lens is driven by a motor (not shown) until the digital signal of the binary code and the digital signal of the subtractor or adder 27 are brought into agreement with each other. In the above case also, for causing the digital signal of the subtractor or adder 27, which is the corrected distance signal, to correctly correspond with the advanced position of the objective lens, a deviation equivalent to the time period ΔT1 as converted into time has only to be imparted between the advancing position of the objective lens and the binary code.

It should be noted here that the present invention is not limited to the foregoing embodiments, but may be modified in various ways within the scope. For example, the distance measuring portion utilizing the principle of the trigonometric distance measuring described as employed in the foregoing embodiments may be replaced by other distance measuring portions of known type using photoresponsive elements, for example, by those types which are arranged to detect the difference between brightness and darkness of the target object by photoresponsive elements.

It should also be noted that in equal to its foregoing embodiments, the configuration of the eccentric cam 4 may be altered as desired, for example, so that the angle θ for the deviation of the movable mirror 2a is in proportion to the rotational angle of the eccentric cam 4.

It should further be noted that the absolute value inversion circuit 5 may be modified to be a mere absolute value amplification circuit which inverts the output of the main extreme value detection circuit 6 at a time point at which the output from the absolute value amplification circuit becomes the minimum.

As is clear from the foregoing description, since the distance measuring arrangement according to the present invention is provided with the illuminance detection means which detects the illuminance intensity of the target object and the signal correction means which corrects the distance signal from the distance measuring means according to the output of said illuminance detection means for emitting a corrected distance signal which is not affected by the illuminance intensity of the target object, it can advantageously be applied to target objects having a wide range of illuminance intensity.

Although the present invention has been fully described by way of example with reference to the attached drawings, it is to be noted that various changes and modifications are apparent to those skilled in the art. Therefore, unless such changes and modifications otherwise depart from the scope of the present invention, they should be construed as included therein.

What is claimed is:

1. A distance measuring arrangement having distance measuring means adapted to obtain distance signals based on outputs of photoresponsive elements which comprises;
   means for detecting illuminance intensity of a target object, and
   means for correcting the distance signal from said distance measuring means according to an output of said illuminance intensity detecting means for obtaining the corrected distance signal which corresponds only to the distance of the target object and which is approximately constant with respect to the illuminance intensity of said target object, said distance measuring means being arranged to provide said distance signal as a function of time, said distance signal correcting means further including delay circuitry for delaying the distance signal from said distance measuring means and delay time control circuitry for controlling the delay time by said delay circuitry according to the output of said illuminance intensity detecting means, said corrected distance signal being arranged so as to be generated later than said distance signal by the time period corresponding to the illuminance intensity of said target object;
   wherein said delay time control circuitry is so arranged that, when the illuminance intensity E of said target object is higher than a threshold illuminance intensity E2 at which a delay in response begins to take place in said distance measuring means, said delay circuit is caused to function only by the response delay time period ΔT1 of said distance measuring means with respect to a predetermined minimum illuminance intensity E1 and when the illuminance intensity E of said target object is between said predetermined minimum illuminance intensity E1 and said threshold illuminance intensity E2, said delay circuit is caused to function by the time period obtained by subtracting a response delay time period ΔT(E) of said distance measuring means with respect to a then prevailing illuminance intensity from said response delay time period ΔT1.

2. A distance measuring arrangement having distance measuring means adapted to obtain distance signals based on outputs of photoresponsive elements which comprises;
   means for detecting illuminance intensity of a target object, and
   means for correcting the distance signal from said distance measuring means according to an output of said illuminance intensity detecting means for obtaining the corrected distance signal which corresponds only to the distance of the target object and which is approximately constant with respect to the illuminance intensity of said target object, said distance measuring means being arranged to provide said distance signal as a function of time, said distance signal correcting means further including delay circuitry for delaying the distance signal from said distance measuring means and delay time control circuitry for controlling the delay time by said delay circuitry according to the output of said illuminance intensity detecting means, said corrected distance signal being arranged so as to be generated later than said distance signal by the time period corresponding to the illuminance intensity of said target object;
   wherein said distance measuring means is provided with a first register in which said distance signal in the form of digital signals can be loaded, said distance signal correcting means including an A/D converter for converting an output of said illuminance intensity detecting means into the digital signal, a ROM in which a correction amount corresponding to the illuminance intensity is stored, a second register capable of being loaded with the output of said A/D converter and designating address of said ROM according to said loaded output, a third register capable of being loaded with the correction amount stored in the designated address of said ROM, and a subtractor or adder for superposing the contents of said first register and second register.

3. A distance measuring arrangement as claimed in claim 2, wherein said correction amount is so determined as to correspond to the response delay time period $\Delta T1$ of said distance measuring means with respect to said predetermined minimum illuminance intensity E1 when the illuminance intensity of the target object is higher than the threshold illuminance intensity E2 at which the delay in the response begins to take place in said distance measuring means, and to correspond to the time period obtained by subtracting the response delay time period $\Delta T(E)$ of said distance measuring means with respect to the then prevailing illuminance intensity from said response delay time period $\Delta T1$ when the illuminance intensity of the target object is between said predetermined minimum illuminance intensity E1 and said threshold illuminance intensity E2.

4. In a distance measuring arrangement which includes:
first photoresponsive means adapted to detect illuminance intensity of a target area which is located in a given direction in front of said first photoresponsive means;
second photoresponsive means laterally spaces from said first photoresponsive means;
optical scanning means movable for scanning a scene including said target area at a given speed so as to cause said second photoresponsive means to detect the illuminance intensity of the aimed area of said scene being scanned by said scanning means, the output of said second photoresponsive means being coincident with that of said first photoresponsive means when said scanning means is moved to a scanning position to cause said second photoresponsive means to detect the illuminance intensity of said target area being detected by said first photoresponsive means;
means for generating a reference signal upon passing of said scanning means through a given initial scanning position; and
means for generating a distance signal by detecting the coincidence of said both outputs of said first and second photoresponsive means, the period of time from the generation of said reference signal till that of said distance signal corresponding to the distance to said target area;
an improvement comprising:
means for detecting the average illuminance intensity of said target area; and
means for generating a corrected distance signal under the control of said illuminance intensity detecting means such that said corrected distance signal is generated later than said distance signal by a period of time corresponding to the average illuminance intensity of said target area;
wherein said corrected signal generating means includes a delay circuit which starts operating in response to said distance signal to generate said corrected distance signal after a lapse of a delay time from the generation of said distance signal and further includes a delay time control circuit which controls the length of the delay time in accordance with the output of said average illuminance intensity detecting means;
and wherein said delay time control circuit is arranged so that, when the illuminance intensity E of said target area is higher than a threshold illuminance intensity $E_2$ at which a delay in response takes place in said first and second photoresponsive means, the length of the delay time is equal to a delay time period $\Delta T_1$ of said first and second photoresponsive means with respect to a given minimum illuminance intensity $E_1$ and is further arranged so that, when the illuminance intensity E of said target area is between said illuminance intensities $E_1$ and $E_2$, the length of the delay time is equal to such a period of time obtained by subtracting a delay time period $\Delta T(E)$ of said first and second photoresponsive means with respect to the prevailing average illuminance intensity of said target area from said delay time period $\Delta T_1$ of said first and second photoresponsive means with respect to said minimum illuminance intensity $E_1$.

5. In a distance measuring arrangement which includes:
first photoresponsive means adapted to detect illuminance intensity of a target area which is located in a given direction in front of said first photoresponsive means;
second photoresponsive means laterally spaced from said first photoresponsive means;
optical scanning means movable for scanning a scene including said target area at a given speed so as to cause said second photoresponsive means to detect the illuminance intensity of the aimed area of said scene being scanned by said scanning means, the output of said second photoresponsive means being coincident with that of said first photoresponsive means when said scanning means is moved to a scanning position to cause said second photoresponsive means to detect the illuminance intensity of said target area being detected by said first photoresponsive means;
means for generating a reference signal upon passing of said scanning means through a given initial scanning position; and
means for generating a distance signal by detecting the coincidence of said both outputs of said first and second photoresponsive means, the period of time from the generation of said reference signal till that of said distance signal corresponding to the distance to said target area;
an improvement comprising:
means for detecting the average illuminance intensity of said target area; and
means for generating a corrected distance signal under the control of said illuminance intensity detecting means such that said corrected distance signal is generated later than said distance signal by a period of time corresponding to the average illuminance intensity of said target area;
wherein said corrected distance signal generating means includes:

a clock pulse generator for generating clock pulses of a given frequency;

a counter for counting said clock pulses only during a period of time from the generation of said reference signal till the generation of said distance signal;

a first register capable of being loaded with the number of said clock pulses counted by said counter;

an A/D converter for converting the output of said illuminance intensity detecting means into a digital signal;

a ROM having addresses in each of which a predetermined correction amount corresponding to a value of illuminance intensity is stored, the correction amounts stored in different addresses of said ROM being different from each other;

a second register capable of being loaded with the digital signal from said A/D converter and designating one of said addresses of said ROM in accordance with said loaded digital signal;

a third register capable of being loaded with the correction amount stored in the designated address of said ROM; and a subtractor or adder for superposing the contents of said first and third registers to generate a digital signal which constitutes said corrected distance signal.

6. An improvement as defined in claim 5, wherein the correction amount stored in each address of said ROM corresponds to $\Delta T_1 - \Delta T(E)$, wherein $\Delta T_1$ represents the delay time period of said first and second photoresponsive means with respect to a predetermined minimum illuminance intensity and $\Delta T(E)$ represents a delay time period of said first and second photoresponsive means with respect to a predetermined range of values of illuminance intensity which said target area may have.

* * * * *